(12) United States Patent
Whitt

(10) Patent No.: US 6,330,326 B1
(45) Date of Patent: Dec. 11, 2001

(54) DYNAMIC STAFFING OF SERVICE CENTERS TO PROVIDE SUBSTANTIALLY ZERO-DELAY SERVICE

(75) Inventor: Ward Whitt, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/049,037

(22) Filed: Mar. 27, 1998

(51) Int. Cl.$^7$ ........................................................ H04Q 3/64
(52) U.S. Cl. ............................ 379/265.13; 379/265.12; 379/266.02; 379/266.08
(58) Field of Search ........................ 379/265, 266, 379/309, 113, 219, 220, 265.13, 265.12, 266.02, 266.08

(56) References Cited

U.S. PATENT DOCUMENTS

| | | | |
|---|---|---|---|
| 4,788,715 | | 11/1988 | Lee ............................................ 379/84 |
| 5,020,095 | | 5/1991 | Morganstein et al. .................. 379/67 |
| 5,185,780 | * | 2/1993 | Leggett .................................... 379/34 |
| 5,506,898 | * | 4/1996 | Costantini et al. .................... 379/266 |
| 5,506,989 | | 4/1996 | Costantini et al. .................... 379/266 |
| 5,561,711 | * | 10/1996 | Muller ................................... 379/266 |
| 5,754,639 | * | 5/1998 | Flockhart et al. .................... 379/265 |
| 5,867,572 | * | 2/1999 | MacDonald et al. ................. 379/266 |
| 5,903,641 | * | 5/1999 | Tonisson ............................... 379/266 |
| 5,911,134 | * | 6/1999 | Castonguay et al. ..................... 705/9 |
| 5,915,011 | * | 6/1999 | Miloslavsky .......................... 379/265 |
| 5,923,873 | * | 7/1999 | Massey et al. ........................ 395/670 |
| 5,926,538 | * | 7/1999 | Deryugin et al. ..................... 379/265 |
| 5,982,873 | * | 11/1999 | Flockhart et al. .................... 379/266 |
| 6,005,932 | * | 12/1999 | Bloom .................................. 379/265 |
| 6,023,681 | * | 2/2000 | Whitt ....................................... 705/8 |
| 6,044,355 | * | 3/2000 | Crockett et al. ......................... 705/8 |

FOREIGN PATENT DOCUMENTS

| | | |
|---|---|---|
| 0 755 144 A2 | 1/1997 | (EP) . |
| WO 97/15136 | 4/1997 | (WO) . |

OTHER PUBLICATIONS

M. Perry, A. Nilsson, Performance Modeling of Automatic Call Distributors Assignable Grade of Service Staffing UXIV International Switching Symposium, Oct. 25–30, 1992, pp. 294–298.*

"Server Staffing to Meet Time—Varying Demand," Management Science (1996).

U.S. application No. 08/580,264, filed Dec. 28, 1995, "Method of Determining Server Staffing".

* cited by examiner

Primary Examiner—Harry S. Hong
Assistant Examiner—William J. Deane, Jr.
(74) Attorney, Agent, or Firm—Kenyon & Kenyon

(57) ABSTRACT

A service system provides substantially zero delay service and dynamically adjusts resources required to provide the service. According to an embodiment of the present invention, future staffing requirements of the service system are predicted by determining, of a number of customers currently in service, how many will remain in service at a predetermined future time and how many customers to arrive to the system in the future can be expected to remain in service at the predetermined future time. For customers in service, customers may be classified according to one or more attributes known for the customer. The attributes may be helpful to identify a type of service being provided to the customer and determine a remaining service time for the customer. Thus, the customer attributes may provide for more accurate staffing predictions than in the prior art.

18 Claims, 4 Drawing Sheets

DYNAMIC STAFFING OF SERVICE CENTERS TO PROVIDE SUBSTANTIALLY ZERO-DELAY SERVICE

BACKGROUND OF THE INVENTION

The present invention provides a telephone call center with dynamic staffing of service agents to provide service to incoming calls with substantially zero delay.

Telecommunication systems are well known retail sales devices. A typical implementation of a known system is shown in FIG. 1. There, a telephone call center 200 is provided in communication with a telephone network 100, such as the Public Switched Telephone Network. The telephone call center 200 may include a communication switch 210 and a telecommunications queue 230 that is controlled by a control processor 220. The call center 200 may also include a plurality of agents $A_1$–$A_n$, each of which is able to service a given number of incoming calls. Thus, the number of agents determines the capacity of the telephone call center 200.

When all agents are occupied, the telephone call center cannot provide service to a new customer. Accordingly, it is common to place the customer in a telecommunications queue. The new customer sits idle in the queue until an agent becomes available to serve the new customer.

Telecommunications queues can cause customer dissatisfaction. The customer often cannot transact other business while he waits in queue. Further, the customer cannot determine his position in the queue or estimate the length of time that he will wait in the queue. The fact that the customer is placed in the queue may be interpreted by the customer as indifference on the part of the retailer to the customer.

Telecommunications based retail operations are highly competitive businesses. Retailers compete on a host of factors, including quality of service and costs. Often the factors themselves are competing. A retailer may choose to improve service by increasing the number of service agents present at the call center. However, agents must be trained. They require certain tools, such as computer and telephone equipment, to service customers. Thus, the decision to increase the number of agents servicing customers may incur additional cost.

There is a need in the art for telephone call center that improves service quality by providing substantially zero delay service and yet maintains the cost of such service at a minimum.

SUMMARY OF THE INVENTION

The disadvantages of the prior art are alleviated to a great extent by a service system that provides substantially zero delay service and dynamically adjusts resources required to provide the service. According to an embodiment of the present invention, future staffing requirements of the service system are predicted by determining, of a number of customers currently in service, how many will remain in service at a predetermined future time and how many customers that will come to the system in the future can be expected to remain in service at the predetermined future time.

For customers in service, customers may be classified according to one or more attributes known for the customer. The attributes may be helpful to identify a type of service being provided to the customer and determine a remaining service time for the customer. Thus, the customer attributes may provide for more accurate staffing predictions than in the prior art.

DETAILED DESCRIPTION

The present invention provides a telephone call center system that dynamically alters the number of agents at the call center to accommodate incoming calls. The call center is characterized by two key attributes: 1) scale and 2) flexibility. "Scale" implies large size. With large size, fluctuations in demand over time tend to be a smaller percentage of the average workload; i.e., the workload of larger systems tends to be more predictable. Under regularity conditions, the required staffing level at any time has an approximate Poisson distribution. The possible fluctuations of a Poisson distribution are characterized roughly by its standard deviation, which is always the square root of the mean. As the mean increases, the standard deviation becomes a smaller proportion of the mean. Expressed differently, extra staffing to account for fluctuations tends to be about $c\sqrt{m}$ for some constant c, typically with $1 \leq c \leq 10$ when the mean is m. Thus, for very large m, we can staff very near the mean m. Then the problem reduces to predicting the mean.

"Flexibility" describes the ability of the service system to dynamically control the staffing response. Flexible staffing can be achieved by ensuring that agents (the staff of the call center) have alternative work. Natural forms of alternative work are training and after-call processing of previous calls. Flexibility is achieved by having agents do alternative work when demand is relatively low. Idle agents may also be used to make contact with customers by making calls themselves. With substantial alternative work, there can be a large number of agents in the center not currently answering calls who are available to start answering calls on short notice. Of course, with advanced communication systems, physical proximity is not a critical requirement.

Alternative work is not described with particularity in the following discussion. The number and types of alternate work that are available should vary with the application to which the call center is directed. However, alternate work should be of a type that permits staffing changes to be made within the lead time established by the present invention.

Figure 1:
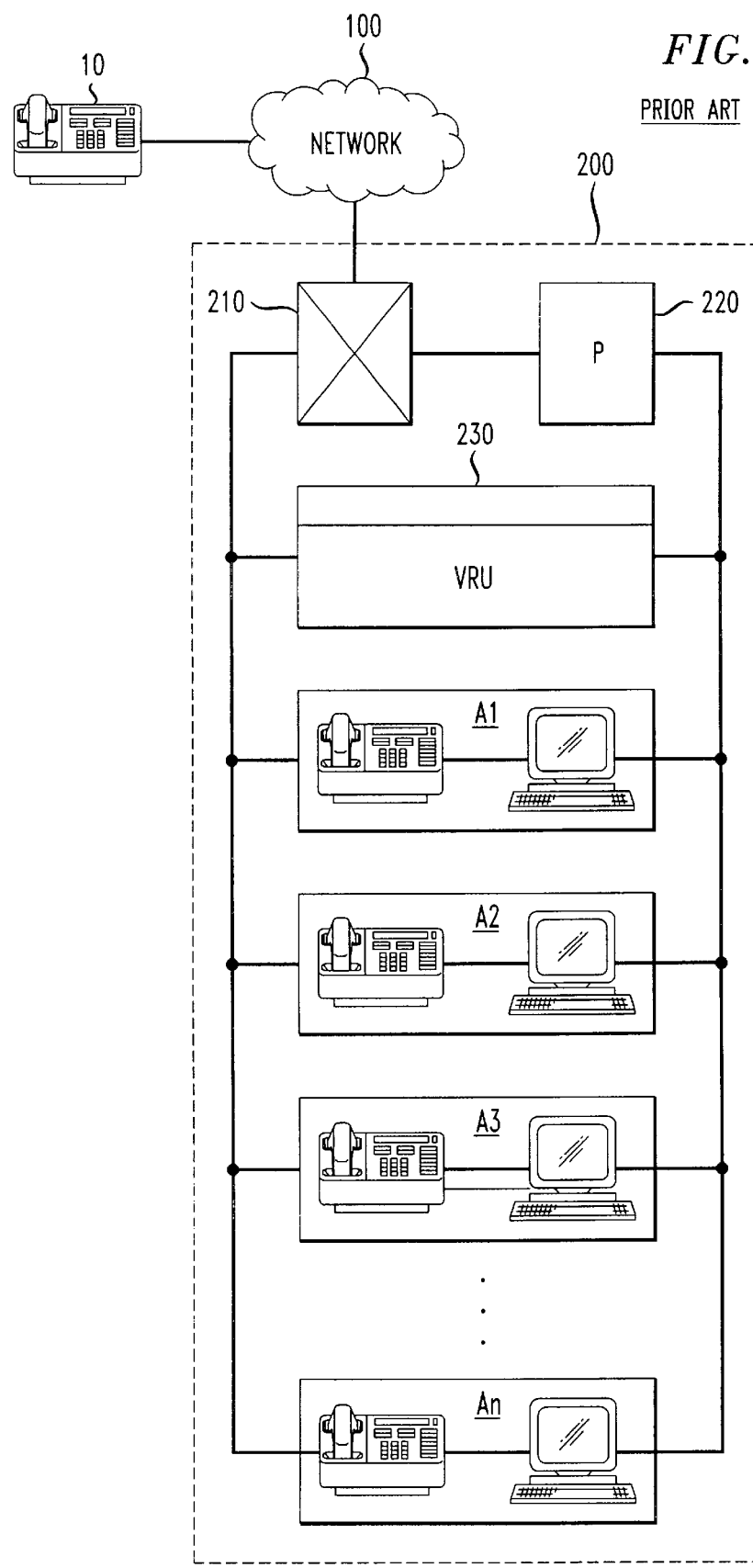
FIG. 1 illustrates a telephone call center of the prior art.
Figure 2:
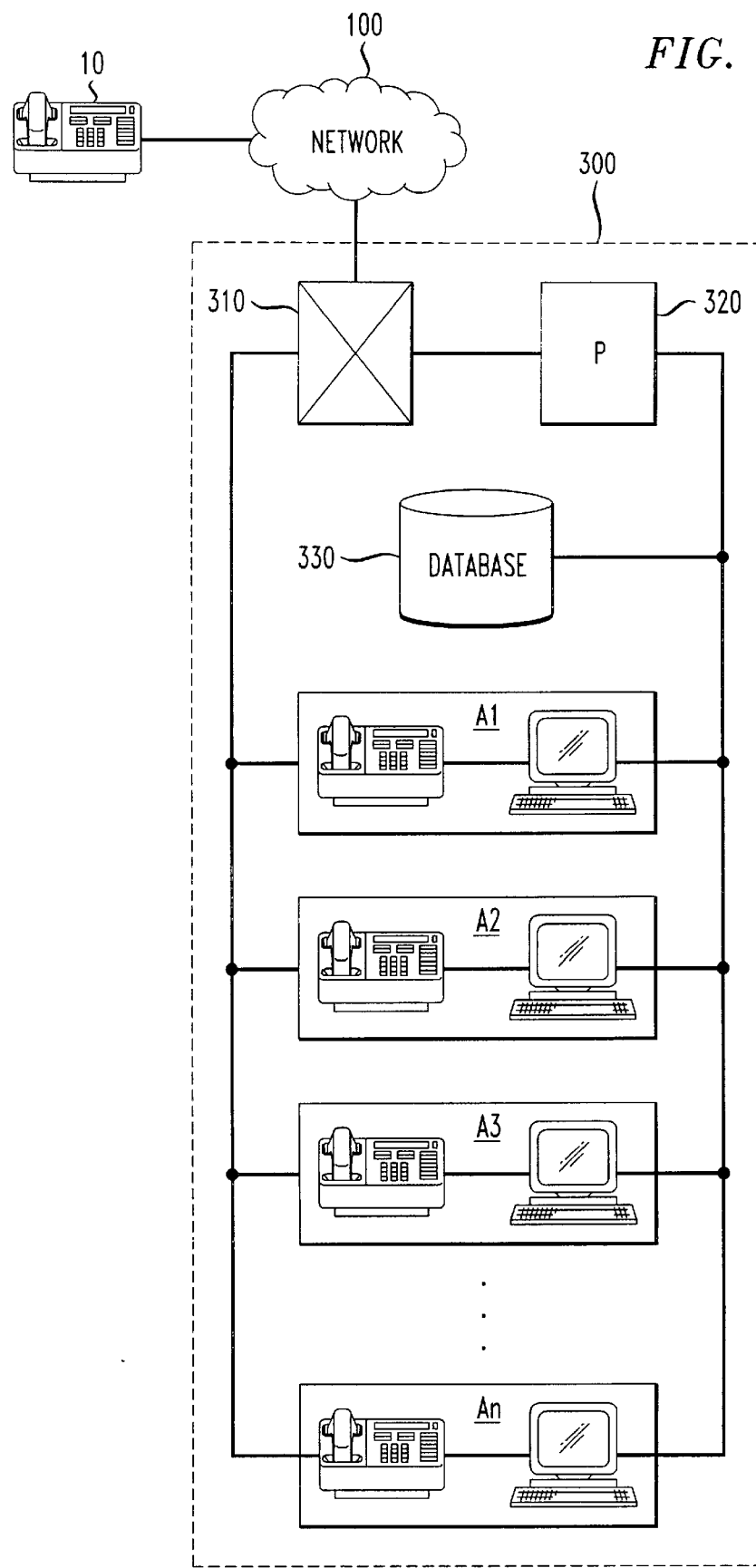
FIG. 2 illustrates a telephone call center constructed in accordance with an embodiment of the present invention.

FIG. 2 illustrates a call service center 300 constructed in accordance with an embodiment of the present invention. The call service center 300 may be connected to the PSTN or other telephone network 100. As in the prior art, the service center includes a switching matrix 310 and control processor 320 as well as a plurality of agents $A_1$–$A_n$. However, as disclosed herein, the number of agents n provided at any given time is modulated by the processor 320 over time.

The call service center 300 includes a memory 330, such as a database, that stores a history of calls to the call service center 300. As new customers arrive to the call service center 300 and receive service, the processor 320 coordinates with the agents Al–An to classify the customers (and, possibly, the agents themselves) according to a number of attributes. The processor 320 integrates each call into the stored call history and indexes the call history according to the attributes of classification. Classification and its relationship to call histories are described in greater detail herein.

Figure 3:
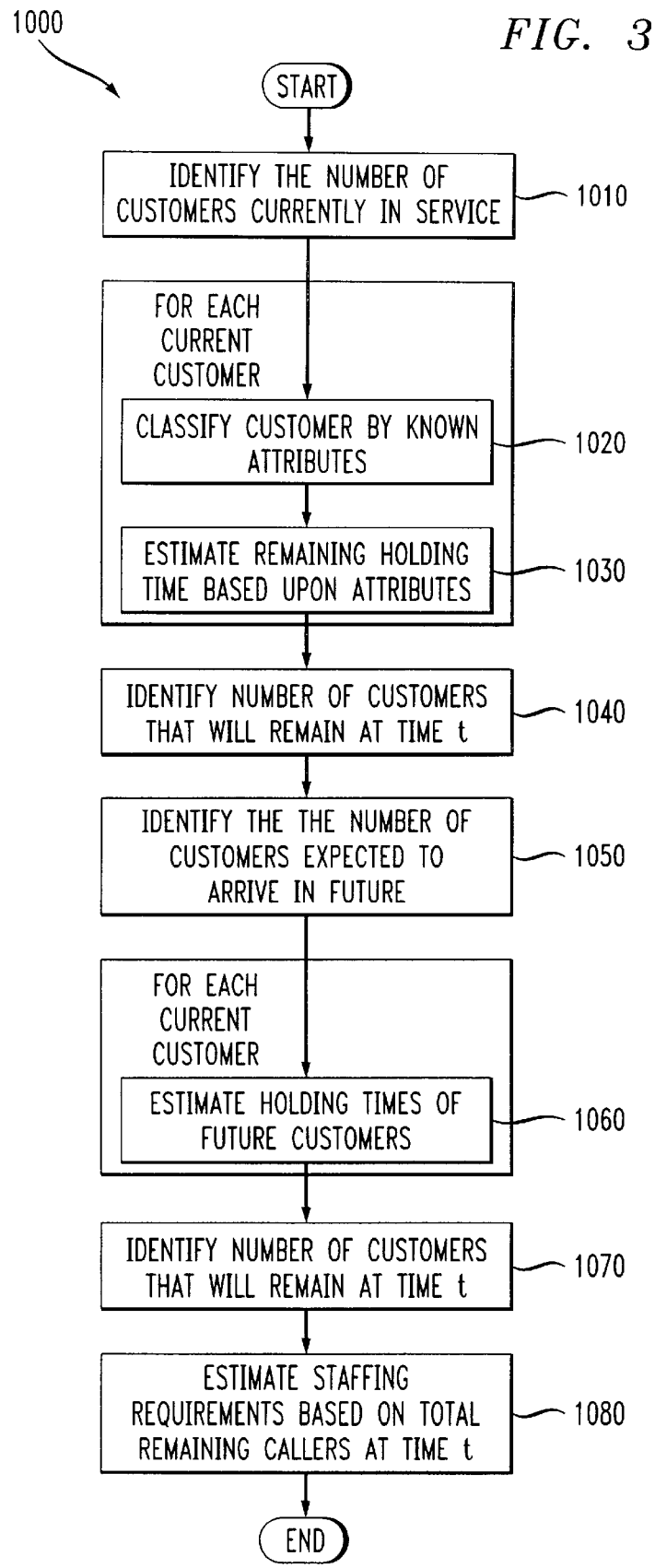
FIG. 3 illustrates a method of operation of the processor 320 of FIG. 2 in accordance with an embodiment of the present invention.

According to an embodiment of the present invention, the processor operates in accordance with the method 1000 shown in FIG. 3. At some future time t for which staffing requirements are to be predicted, the staffing requirements will be derived from two contributing factors: 1) the number of customers currently in service that will remain in service at time t, and 2) the number of customers that will arrive to the call center in the future and will remain in service at time t. According to the method, at the time of prediction, the processor 320 identifies the number of customers currently in service (Step 1010). For each current customer, the processor 320 classifies the customer based on one or more attributes known for the customer (Step 1020). The processor 320 predicts a probability distribution function ("PDF") for the remaining holding time of the customer based on the known attributes (Step 1030). A PDF is a function F(t) representing the probability that the holding-time will be less than or equal to t for all possible t. Once remaining holding-time PDFs are predicted for each customer, the processor 320 estimates the probability distribution of a number of the current customers that will remain in service at time t (Step 1040). The PDFs of the holding-time and the number of current customers remaining in service each may be characterized partially in terms of a mean and a variance.

Similarly, the processor 320 predicts a number of customers expected to arrive in the future (Step 1050). The prediction may be made with reference to the call history stored in the database 330. For each expected future customer, the processor 320 also predicts a holding-time PDF (Step 1060). Based on the predicted holding-time PDFs, the processor 320 estimates a probability distribution of a number of expected future customers that will remain in service at time t (Step 1070). Again, the PDFs of the number of expected future customers to remain in service may be characterized partially in terms of a mean and a variance.

Based upon the probability distributions of the number of current customers and expected future customers remaining in service at time t, the processor 320 estimates staffing requirements of the call service center 300 (Step 1080). The processor 320 may begin procedures to activate agents to meet the estimated staffing requirements (step not shown).

The following analysis discusses specific implementation issues regarding estimation of staffing requirements including such issues as: how the number of current customers and the number of future customers contribute to staffing requirements as the prediction interval varies, how current customers are classified and how predictions of the number of future customers are made. The discussion also explores conditional probability issues that arise when an actual system event diverges from historical trends. For example, conditional probability estimations may be made when a classified customer's behavior differs from the normal pattern of behavior exhibited by other customers with the same classified attributes. Also, for example, conditional probability estimations may be made to the number of expected future customers when the actual arrival rate differs from normal arrival rates previously observed.

The following analysis assumes that all calls are immediately answered, because zero delay service is the goal of the present invention. The immediate-answer property means that ordinary performance analysis concerns about the impact of waiting before beginning service or blocking and retrials after blocking need not be considered. It suffices to use an infinite-server model.

Current Calls Remaining in the Future

For lead times (the length of the interval until the time for which the prediction is made) that are larger than all but a few call holding times, calls currently in progress tend not to contribute significantly to a prediction of future staffing requirements. However, the present invention finds utility in predicting staffing requirements for lead times that are less than many call holding times. For example, there might be a lead time of 5 minutes in an airline reservation system or a software support call center, where many calls exceed 30 minutes.

As is known, calls to the telephone call center 300 may possess one of a variety of holding-time distributions. It is useful to classify each call and estimate a holding-time distribution based on the class. One class might have a very short mean holding time of (say, 1 minute) while another class has a substantially longer mean holding time of (say, 30 minutes) Consider an airline or hotel reservation system, where some reservations are made very quickly but others are substantially longer because they require customer inquiry and search. Customers may be classified according to one or more attributes that permit one of the possible holding-time distributions to be attached to the call. Thus, it is possible to break away from the conventional stochastic models that are traditionally used in performance analysis.

A conventional stochastic model has all holding times exponentially distributed with a common mean. With that model, the only relevant information is the number of active calls. The number of active calls can of course be an important factor for predicting future requirements, but it is not the sole factor.

Customers are categorized by one or more customer attributes. From those customer attributes, a PDF of the remaining holding time is generated for each customer. These holding-time PDFs permit the controller 320 to predict a number of customers in service that will remain in service at the future time t.

Several customer attributes may be used to predict a service time PDF for the customer. First, the customer's identity may be used. The identity may be provided by the customer himself, such as by a membership identification number, or may be provided by network 100, such as by the Automatic Number Identifier (also "ANI") conventional to the PSTN. Consider again the airline reservation system example above. Calls from frequent flyers who repeatedly travel on a limited number of flights may be very short because the customer knows beforehand the flight that will be reserved. Accordingly, the customer identifier may be used to recall previous calling history of the customer from database 330. The calling history serves as a basis for predicting the holding time of the current call.

The destination telephone number entered by the customer may be an attribute to be used to classify calls. As is known in certain business applications, a single call center 300 may be reached by more than one telephone number. Each telephone number may be related to a different type of service offered by the call center 300. Inasmuch as the destination telephone number dialed by the customer identifies the subject matter of the call, it may be used as a basis for a holding-time distribution.

Customer activity also is an appropriate attribute for classification. During the course of a call, the customer and/or agent may engage in conduct that materially alters the holding-time distribution. Thus, the processor 320 may monitor the activity of the agent to identify attributes to be used for classification.

Classification also extends to each agent providing service. Agents may have special skills. When an agent provides service for which the agent is particularly skilled, the holding time of the call is expected to be shorter than when the agent provides service for which the agent is unskilled. Thus, when classifying the call, the processor 320 may classify the customer by a type of service required and then determine the skill level of the agent in providing the required service. Any correlation between the required service and the skill level of the agent is another factor to be used to determine a holding time distribution of the call.

Agents may estimate directly the remaining length of the current call and provide updates to processor 320 while the call remains in progress. Alternatively, the processor 320 may monitor the agents as they provide service and derive attributes from the agent's activity.

The agents may not only be able to classify the calls, but the agents may also be able to control the remaining holding times of calls. When the system is heavily congested, for example, agents may be directed to take action that shortens calls in progress. When such a policy is used, remaining holding times are re-evaluated accordingly.

In an embodiment of the invention, the present invention may include an assignment system that attempts to determine a type of required service for a new call as the new call is received at the call center. For those calls where a type of required service can be determined before an agent is selected to service the call, the assignment system considers the agents that are available to field the call. The assignment system routes the call to the one available agent having the greatest skill in providing the type of required service. Thus, the assignment system may attempt to assign calls to agents with the appropriate special skills, but if that assignment is not possible, then the assignment will be made to an alternative agent. When future staffing requirements are being considered, it is possible to take account of the assignments in progress. The assignment system would be resident in processor 320 and applied to new calls received at the switch matrix 310.

The following describes a general model to predict the number of current calls remaining in the future where the number n of current calls is known. The remaining holding time for call i conditional on all available system state information is taken as a random variable $T_i$ with PDF $H_i$:

$$P(T_i \leq t) = H_i(t), t \geq 0. \tag{2.1}$$

The random variables $T_i$, $1 \leq i \leq n$, are taken to be mutually independent.

Let C(t) be the number of the current calls in progress t time units in the future. By the assumptions above, for each t, C(t) is the sum of n non-identically-distributed Bernoulli ({0,1} valued) independent random variables. Thus, the mean and variance of C(t) can be computed:

$$EC(t) = \sum_{i=1}^{n} H_i^c(t), t \geq 0, \text{ and} \tag{2.2}$$

$$VarC(t) = \sum_{i=1}^{n} H_i(t) H_i^c(t), t \geq 0, \tag{2.3}$$

where $H_i^C(t) = 1 - H_i(t)$. Assuming that n is relatively large, it is natural to regard C(t) as normally distributed with mean and variance in Eqs. 2.2 and 2.3, by virtue of the central limit theorem for independent non-identically-distributed random variables.

EC(t) in Eq. 2.2 is decreasing in t for all t. The behavior of the variance Var C(t) in Eq. 2.3 is somewhat more complicated. If $H_i(t)$ is differentiable at t and if $H_i(t) \leq (\geq)^{1/2}$, then $H_i(t) H_i^C(t)$ is increasing (decreasing) in t. Thus, Var C (t) is concave, first increasing and then decreasing. If t is sufficiently short, then EC(t) is relatively large while Var C(t) is relatively small, so that prediction is important and accurate prediction is possible.

Implementation depends on being able to appropriately identify the PDF's $H_i(t)$. There are several natural scenarios. If current call i is known to have holding-time PDF $G_i$ upon arrival, and nothing more is known except that the elapsed holding time is $t_i$, then $H_i$ is taken to be the conditional PDF of the remaining service time given the elapsed holding time $t_i$:

$$H_i(t) = \frac{G_i(t + t_i) - G_i(t_i)}{G_i^c(t_i)}, t \geq 0, \tag{2.4}$$

where $G_i^C(t) = 1 - G_i(t)$. Eq. 2.4 exploits two pieces of information: the original PDF $G_i$ for the respective call (which depends on a confluence of factors, including the agent handling it) and the elapsed holding time $t_i$.

Of course, if $G_i$ is an exponential PDF, then $H_i$ in Eq. 2.4 is just $G_i$ again, by the lack-of-memory property of the exponential distribution. However, if:

$$G_i(t) = 1_{[c,\infty)}(t), \tag{2.5}$$

where $1_A(t) = 1$ if $t \in A$ and 0 otherwise, corresponding to a constant holding time of length c associated with a very well defined task, then $H_i(t)^- = 1_{[c-t_i, \infty)}(t)$, corresponding to a constant remaining holding time of length $c - t_i$. Obviously, it is possible to predict very accurately with low-variability holding times. In many scenarios, low variability can be achieved after the call has been properly classified. Many tasks have highly predictable durations. High variability often stems from having uncertainty about which of two or more possible predictable tasks is required. Thus, there is reason to expect that the variance Var C(t) will be small when the proper information is brought to bear.

On the other hand, if $G_i$ is highly variable, then the elapsed holding time still can help in future prediction. With highly variable holding-time distributions, a very long elapsed holding time typically implies a very long remaining holding time. To illustrate, let Y(a, b) denote a random variable with a Pareto distribution:

$$P(Y(a,b) \leq t) = 1 - (1 + bt)^{-a}, t \geq 0. \tag{2.6}$$

The high variability of Y(a, b) is indicated by the fact that the tail decays as a power instead of exponentially. Now, let $Y_t(a,b)$ denote the conditional remaining holding time given an elapsed holding time t. It turns out that $Y_t(a, b)$ is distributed as $(1+bt)Y(a, b)$. Hence, $$EY_t(a,b) = (1+bt)EY(a,b); \tag{2.7}$$

i.e., the mean remaining holding time $EY_t(a, b)$ is approximately proportional to the elapsed holding time t.

If the PDF $G_i$ is known but the elapsed holding time is not available, then it is still possible to exploit the fact that service is in process. To do so, it is it is natural to use the equilibrium-excess PDF associated with $G_i$, namely:

$$H_i(t) = G_{ie}(t) \equiv \frac{1}{ET_i} \int_0^t [1 - G_i(u)] du. \quad (2.8)$$

For an M/G/∞ queuing model in steady state, Eq. 2.8 is in fact the exact distribution of the remaining holding time.

As indicated above, it may be possible to directly predict the remaining holding time PDF $H_i$ while the call is in progress. If only partial information is given, then it is natural to fit the PDF to the available information. For example, if only the mean $m_i$ of $H_i$ is specified, then $H_i$ can be fit to an exponential PDF with mean $m_i$ by setting:

$$H_i(t) = 1 - e^{-t/m_i}, \, t \geq 0. \quad (2.9)$$

However, even if only the mean of $H_i$ is given directly, it should be possible to do better by exploiting historical data. Depending on the application, we should be able to assess the variability. More generally, we can assume that:

$$H_i(t) = F_i(t/m_i), \, t \geq 0. \quad (2.10)$$

where $F_i$ is a PDF with mean 1 and the right shape. Then the scaling by $m_i$ in Eq. 2.10 makes the PDF $H_i$ have mean $m_i$ and the shape of $F_i$. For example, highly variable holding times might have the Pareto shape in Eq. 2.6 for some $a \geq 1$, where b is chosen to produce mean 1. Note that Eq. 2.9 is a special case of Eq. 2.10 with $F_i(t) = 1 - e^{-t}$.

The goal in bringing information to bear on the PDF's is to have $H_i(t)$ either be close to 1 or close to 0 for the desired lead time t. If $H_i(t) \approx 1$ for many i, while $H_i(t) \approx 0$ for the remaining i then the mean EC(t) in Eq. 2.2 will be substantial, while the variance Var C(t) in Eq. 2.3 will be small.

For a concrete example, suppose that $H_i(t) = 1-c$ for a fraction p of the calls, while $H_i(t) = c$ for the remainder of the calls. Then EC(t)=n(pc+(1−p)(1−c)) and Var C(t)=nc(1−c). The degree of uncertainty can be characterized approximately by the ratio of the standard deviation to the mean, which here is:

$$\frac{SD(C(t))}{EC(t)} \approx \frac{1}{\sqrt{n}} \left( \frac{\sqrt{c(1-c)}}{pc + (1-p)(1-c)} \right). \quad (2.11)$$

The ratio of Eq. 2.11 tends to be small if either n is large or c is near 1 or 0, provided that p is not small.

New Calls in Progress in the Future

It is also necessary to predict how many new calls will be in progress in the future. Part of this prediction involves predicting the future arrival rate of new calls, but it must also consider how long the new calls will remain in service, since some new arrivals may arrive and depart within the specified lead time. The approach of this second problem also starts with the $M_t/G/\infty$ queuing model, which is assumed to start empty. The system is assumed to start empty because calls in progress are considered in the above analysis. It is natural to assume a Poisson arrival process, which can be justified by the assumption that arriving customers act independently of each other. However, reality usually dictates that the arrival-rate function $\lambda(t)$ should be time-varying. Thus the arrival-rate function $\lambda(t)$ is thought to be time-varying but deterministic. In fact, $\lambda(t)$ is not known, so that $\lambda(t)$ should properly be thought of as the realization of a stochastic process $\{\Lambda(t): t \geq 0\}$. However, as an approximation, let $\lambda(t)$ be the mean $E\Lambda(t)$ and aim to estimate it. Then use this mean value as the deterministic arrival-rate function in the $M_t/G/\infty$ model. System state is exploited to reduce the uncertainty about the future arrival rate.

A useful first step is to classify the arrivals into different call types. The separate call types are independent, so that simple addition of the means and variances of the different types obtain the mean and variance of the total number of new arrivals present at time t. A single call type is described below.

For any one call type, assume that the arrival process is a nonhomogeneous Poisson process with deterministic arrival-rate function $\lambda(t)$ and that the holding-time is a random variable T with cdf G. Let N(t) be the number of these calls in the system at time t in the future. Using basic properties of infinite-server queues, N(t) has a Poisson distribution with mean (and variance):

$$EN(t) = VarN(t) = m(t) = \int_0^t G^c(t-u)\lambda(u) du. \quad (3.1)$$

It is significant that Eq. 3.1 remains the valid formula for the mean (but not the variance) when $\lambda(t)$ is replaced by a stochastic process $\Lambda(t)$. Because of the linearity associated with the infinite server model, $$EN(t) = E\int_0^t G^c(t-u)\Lambda(u)du = \int_0^t G^c(t-u)E\Lambda(u)du. \quad (3.2)$$

Henceforth, the discussion focuses on Eq. 3.1.

Eq. 3.1 easily can be calculated numerically. It should suffice to use the simple trapezoidal rule approximation:

$$m(t) \approx \frac{1}{2n} G^c(t)\lambda(0) + \frac{1}{n}\sum_{k=1}^{n-1} G^c(t-(k/n))\lambda(k/n) + \frac{1}{2n} G^c(0)\lambda(t), \quad (3.3)$$

where n is chosen large enough to produce negligible error.

Eq. 3.1 applies with general arrival-rate functions, but given the relatively short time scale for prediction, it might be possible to consider as an approximation a constant arrival rate function, i.e., a step function, which is zero before time 0. In that case, Eq. 3.1 becomes:

$$m(t) = \lambda E(T)G_e(t) = \lambda \int_0^t G^u(u)du \quad (3.4)$$

where $G_e$ is the equilibrium-excess cdf associated with the holding-time cdf G, defined as in Eq. 2.8. For practical applications of Eq. 3.4, it is significant that the equilibrium-excess cdf $G_e$ often inherits the structure of the cdf G. For example if G is a mixture of exponentials or phase type, then so is $G_e$. Moreover, given the Laplace-Stieltjes transform of G:

$$\hat{g}(s) = \int_0^\infty e^{-st} dG(t), \quad (3.5)$$

it is simple to compute $G_e^c(t) = 1 - G_e(t)$ by numerically inverting its Laplace transform:

$$\hat{G}_e^c(s) = \int_0^\infty e^{-st} G_e^c(t) dt = \frac{sET - 1 + \hat{g}(s)}{s^2 ET}. \quad (3.6)$$

Given Eqs. 3.1 or 3.4, the remaining problem is to estimate the appropriate arrival-rate function $\lambda(t)$ and the holding-time cdf G. These should depend on the observation time. The holding-time cdf G should be adequately estimated from historical data (over a much longer time interval than the prediction lead time). The arrival-rate function $\lambda(t)$ is estimated in two steps. In the first step a preliminary estimate of $\lambda(t)$, labeled $\lambda_a(t)$, is obtained over a day, based on seasonal, day-of-the-week and known promotion effects. $\lambda_a(t)$ is the standard prediction that can be done a day. in advance or possibly even a week in advance. Given arrival counts in subintervals of previous days, the arrival rate function $\lambda_a(t)$ might be a linear or quadratic function estimated by least squares. In the second step, $\lambda_a(t)$ is adjusted by taking account of the observed demand during previous times on the same day. A simple approach is to estimate a multiplier $r(t)$ based on the observed history over the day, i.e., the observed demand is taken as $r(t)\lambda_a(t)$. Multiplier $r(t)$ is estimated from the ratio:

$$r(s) = \lambda(s)/\lambda_a(s) \quad (3.7)$$

for times s in the past. In practice, time is divided into equally spaced intervals. Let $\gamma(k)$ and $\gamma_a(k)$ denote the predicted and observed demand in interval k. The ratio $r(n) = \lambda(n)/\lambda_a(n)$ can be predicted for the $n^{th}$ interval by using exponential smoothing:

$$r(n) = \alpha \frac{\gamma(n-1)}{\gamma_a(n-1)} + (1-\alpha) r(n-1) \quad (3.8)$$

$$= \frac{\sum_{k=1}^{m} \alpha^k [\gamma(n-k)/\gamma_a(n-k)]}{\sum_{k=1}^{m} \alpha^k}$$

for some constants m and a. The constants m and a can be chosen by finding the best fit using historical data; e.g., the values that minimize mean squared error.

Given that current time is 0, $\lambda(t) = r(0)\lambda_a(t)$ can be used as the predicted arrival rate for future times t, where $r(0)$ is determined from the recent history up to the current time 0, as in Eq. 3.8.

Predicting Future Demand

The total future demand, $D(t)$, is the sum of the current calls remaining in the future and the new calls in progress in the future:

$$D(t) = C(t) + N(t), t \geq 0. \quad (4.1)$$

The mean is the sum of the means in Eqs. 2.2 and 3.1. The variance is the sum of the variances in Eqs. 2.3 and 3.1. Since both components have approximately normal distributions, so does the sum. Let $N(0,1)$ denote a standard (mean 0, variance 1) normal random variable. Thus, in order to have the probability that demand cannot be satisfied be $\alpha$, the required number of servers at time t is:

$$s(t) = \lceil ED(t) + z_\alpha \sqrt{\text{Var}D(t)} + 0.5 \rceil \quad (4.2)$$

where $P(N(0,1) > z_\alpha) = \alpha$ and $\lceil x \rceil$ is the least integer greater than x. The target probability $\alpha$ is chosen suitably small ($z_\alpha$ suitably large) so that the likelihood of demand exceeding supply at time t is suitably small. Here, all available information up to the current time is dynamically exploited in order to more accurate predict the mean $ED(t)$ and the variance $\text{Var } D(t)$ a relatively short time t in the future.

The estimation procedure can be said to be working if the demand t units in the future is indeed distributed approximately as $N(ED(t), \text{Var } D(t))$. Thus the procedure can be checked with historical data. The estimation scheme is effective if: 1) $ED(t)$ is indeed estimated accurately, and 2) $\text{Var } D(t)$ is suitably small (relative to $ED(t)$) and estimated accurately. Then the required number of servers $s(t)$ will be only slightly greater than actually needed. The overhead due to uncertainty can be described by the percentage difference $s(t) - ED(t)$ is of $ED(t)$. For example, the overhead is 10% if $ED(t) = 400$ and $s(t) = 440$. The overhead represents the cost of providing the high quality of service.

Finally, it remains to ensure that at least the required number $s(t)$ of servers will be available at time t in the future. Greater efficiency can be achieved if some number of servers that are quite sure to be needed, such as $ED(t) - z_\alpha \sqrt{\text{Var } D(t)}$ are committed, while another number, say $2z_\alpha \sqrt{\text{Var } D(t)}$ are made available, but not committed, by being placed on alert. The servers on alert might pursue other tasks, but be ready to answer calls immediately upon notice. This analysis shows the degree of flexibility needed, and how scale can help.

As described, customers that arrive to the call service center 300 may be classified according to a number of attributes. The attributes form a basis to derive holding times for each of a number of possible call types. While service is provided to actual customers, the processor 320 and agents A1–An coordinate to facilitate the classification of customers. At the conclusion of a call, the processor 320 modifies the call history stored in the database 330 to include the newly completed call. Development of call histories of this type is well-known.

As has been described, the prediction of the required number of agents presumes the presence of agents available to provide service to customers. Those agents might be engaged in alternative work. Once a prediction is made that additional agents must be engaged to service future customers demand, the system may generate an alert to selected agents. The alert would provide advance warning that customers soon may be directed to the agent so that the agent may take necessary steps to conclude the alternative work and be prepared to provide service.

The present invention has been described heretofore in the context of the telephone call service center. However, it should be understood that the principles of the present invention are not so limited. The present invention may be applied to any service system wherein system resources may be dynamically allocated in response to changing levels of demand.

Figure 4:
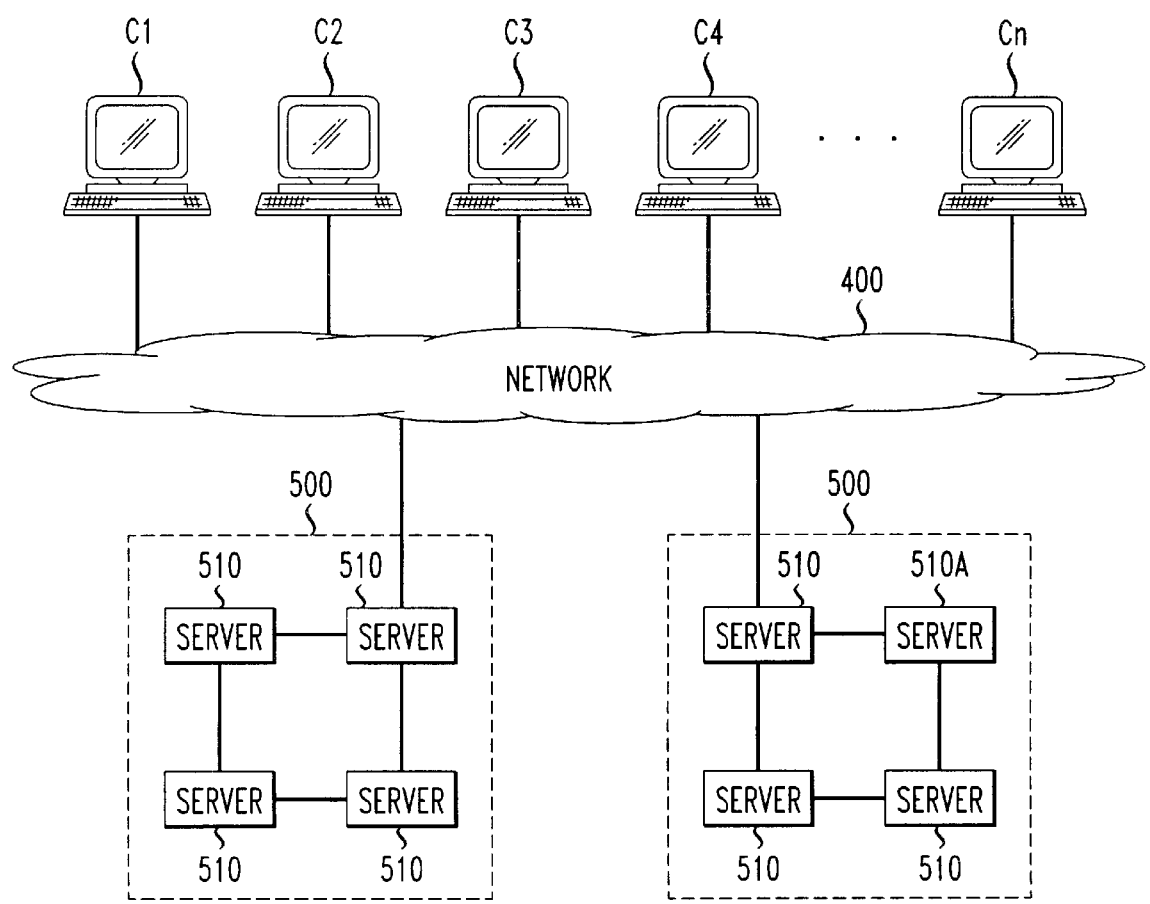
FIG. 4 illustrates a computer server system adapted for use with the methods of the present invention.

FIG. 4 illustrates another service system suitable for application with the present invention. There, a plurality of server systems 500 are connected to a computer network 400 such as the Internet. The computer server systems 500 may each comprise one or more servers 510.

Computer server systems 500 may coordinate to provide a computer-based service to customers that are connected to the computer network 400. As an example, consider an Internet based stock trading and research system. In such an embodiment, zero delay service is critical, for customers that enter trade orders demand almost instantaneous service. In such computer-based service systems, duplicate server systems 500 may be distributed throughout the computer network 400.

The dynamic staffing method of the present invention, shown in FIG. 3, may be applied by one of the servers 510A to dynamically allocate the servers for use. Server 510A coordinates with the remaining servers to implement the method. For example, the server 510A may communicate with the other servers over the computer network 400 to determine how many customers are in service and to obtain attributes of those customers. Server 510A would be provided with a database (not shown) to develop call histories.

In the embodiment of FIG. 4, provision of the staffing methods of the present invention may be particularly significant because servers may be programmed and allocated for a variety of different tasks. Accordingly, it is possible for owners of network connected servers to lease those servers to service providers to accommodate particularly heavy demands for service. Using the principles of the present invention, such server leasing may be done on a real-time basis. Further, when the periods of exceptionally heavy demand conclude, the principles of the present invention also permit un-needed servers to be de-allocated on real-time basis, thus conserving costs.

As implemented in the system of FIG. 4, when a prediction of future demand is performed, the server 510A identifies a number of customers currently in service with all servers 510, 510A (Step 1010). Server 510A communicates not only with the servers 510 in the local computer service center 500, but also with servers of other computer service centers 500 via the computer network 400. For each current customer, the server 510A retrieves attributes known for that customer (Step 1020). Again, as shown above, the server 510A may classify the customer based on its identity, based upon its conduct upon receiving service or by its elapsed service time. Based upon the known attributes, the server 510A estimates a remaining holding-time PDF for the customer (Step 1030). From the estimated remaining holding-time PDF, the server 510A identifies a number of customers that will remain in service at the future time (Step 1040).

The server also identifies the number of customers that are expected to arrive to the computer service centers 500 in the future (Step 1050). The server estimates holding-times of the future customers (Step 1060) and identifies the number of those customers that should remain in service at time t (Step 1070). Based upon the number of customers in service and the number of future customers that will remain in service at time t, the server estimates staffing requirements for the computer service systems 500.

Thus, the principles of the present invention apply equally to provide for dynamic staffing of resources in a service center.

As shown above, the present invention provides a service system that provides for substantially zero delay service and further provides for dynamic staffing of service agents. A prediction of required staffing is made based on the number of current customers that can be expected to remain in service at a future time and the number of future customers that will arrive and remain in service at the future time. Thus, the system achieves the objectives of improved service and conserved resources.

We claim:

1. A resource management method in a service system, comprising:

for each of a number of customers currently in service:
classifying the customer in service according to an attribute known for the customer, and
predicting, based on the attribute, a time when the customer in service will terminate service;

based on the predicted times of termination of the customers in service, estimating a number of the customers in service that will remain in service at a predetermined future time;

predicting a number of customers expected to arrive in the future that will remain in service at the predetermined future time; and scheduling a number of agents sufficient to serve the predicted number of remaining customers in service and the predicted number of new customers at the predetermined future time.

2. The method of claim 1, wherein, for at least one customer in service, the time when the customer in service will terminate service is represented by a probability over time when the customer will terminate service.

3. The method of claim 1, wherein, for at least one customer in service, the time when the customer in service will terminate service is represented by a probability distribution function.

4. The method of claim 3, wherein the probability distribution function is based on an estimated mean time of service for the customer.

5. The method of claim 1, wherein, for at least one customer in service, the attribute of classification is a time elapsed since the one customer first began to receive service.

6. The method of claim 5, wherein, for the one customer, the time when the one customer will terminate service is represented by a conditional probability distribution function of a probability over time when the one customer will terminate service given the elapsed time for the one customer.

7. The method of claim 1, wherein, for at least one customer in service, the attribute of classification is the identity of an agent serving the one customer.

8. The method of claim 1, wherein, for at least one customer in service, the attribute of classification is an upper limit service time for the one customer.

9. The method of claim 1, wherein, for at least one customer in service, the attribute of classification is the identity of the one customer.

10. The method of claim 1, wherein, for at least one customer in service, the attribute of classification is conduct of the one customer during an elapsed time since the one customer first began to receive service.

11. A method of predicting resource requirement for a service system, comprising the steps of:

predicting a number of customers currently in service that will remain in service at a predetermined time, predicting a number of future customers expected to arrive to the system before the predetermined time, for each future customer, estimating a holding time of the future customer, estimating a number of future customers that will remain in service at the predetermined time, scheduling a number of agents sufficient to provide service to the number of current customers and the number of future customers that will remain in service at the predetermined time.

12. The method of claim 11, wherein, for at least one future customer, the time when the future customer will terminate service is represented by a probability over time when the customer will terminate service.

13. The method of claim 11, wherein, for at least one future customer, the time when the future customer will terminate service is represented by a probability distribution function.

14. The method of claim 13, wherein the probability distribution function is based on an estimated mean time of service for the future customer.

15. The method of claim 11, wherein the step of predicting a number of future customers includes predicting the number of future customers given an actual rate of arrival of customers to the service system.

16. The method of claim 11, wherein the step of predicting a number of future customers includes steps of:
   predicting a number of future customers to arrive for each of a variety of call types and
   estimating an aggregate number of future customers based on the predicted number of future customers of each call type.

17. The method of claim 11, wherein the step of predicting a number of future customers includes a prediction based on historical arrival rates of calls to the service system.

18. A resource management method, comprising:
   for each source of current demand:
      classifying the source according to an attribute known for the source, and
   predicting, based on the attribute, a time when the source will cease its demand for service, based on the predicted times of cessation of the source of current demand, estimating a level of demand at a future time from the sources of demand expected to arrive in the future and remain at the future time, and
   identifying an amount of service resources that will be required that will be required to meet the local level of demand in the future.

* * * * *